United States Patent [19]

Osaka et al.

[11] Patent Number: 4,927,560

[45] Date of Patent: May 22, 1990

[54] METHOD FOR PRODUCTION OF INORGANIC MINUTE GLOBULAR PARTICLES

[75] Inventors: Shigemi Osaka; Kazuo Hata; Tsukasa Takahashi, all of Himeji, Japan

[73] Assignee: Nippon Shokubai Kagaku Kogyo Co., Ltd., Osaka, Japan

[21] Appl. No.: 159,889

[22] Filed: Feb. 24, 1988

[30] Foreign Application Priority Data

Feb. 25, 1987 [JP] Japan .................................. 62-40085
Feb. 27, 1987 [JP] Japan .................................. 62-42750
Jul. 10, 1987 [JP] Japan ................................. 62-170868

[51] Int. Cl.$^5$ ............................................. C04B 33/00
[52] U.S. Cl. ................................. 252/315.1; 252/315.7
[58] Field of Search ........................... 252/315.1, 315.7

[56] References Cited

FOREIGN PATENT DOCUMENTS 0147327 8/1985 European Pat. Off. .
2032233 1/1971 Fed. Rep. of Germany .
61-227917 10/1986 Japan .
2149768 6/1985 United Kingdom .

*Primary Examiner*—Mary C. Lee
*Assistant Examiner*—Catherine S. Kilby Scalzo
*Attorney, Agent, or Firm*—Burns, Doane, Swecker & Mathis

[57] ABSTRACT

A method for the production of inorganic minute globular particles, which comprises forming a W/O type sol emulsion by mixing at least one metal oxide-containing sol selected from the group consisting of (a) metal oxide sols and (b) mixed sols containing said metal oxide sols and an inorganic compound, an alkoxide, or a sol of at least one other element with an organic solvent insoluble or sparingly soluble in water in the presence of a surfactant; mixing said emulsion with a basic substance or an electrolyte thereby converting the sol forming the water layer in said emulsion into gel thereby obtaining globular gel particles; and subsequently heating the globular gel particles thereby expelling from the system the water in the globular gel particles in the form of a mixture thereof with the organic solvent.

21 Claims, No Drawings

METHOD FOR PRODUCTION OF INORGANIC MINUTE GLOBULAR PARTICLES

BACKGROUND OF THE INVENTION

1. Field of the Invention

This invention relates to a method for the production of inorganic minute globular particles. More particularly, it relates to a method for the production of inorganic minute globular discrete particles, which method enables the particles to be obtained in diameters selected freely on the order of several hundred microns to submicrons (approximately not more than 1 micron) and distributed in a narrow range.

2. Description of the Prior Art

Minute globular particles, owing to the morphological characteristic thereof, manifest a high packing property and a high sliding property, form an optimum raw material for shaped ceramic articles, prove to be useful as coating agent and a high sliding property, form an optimum raw material for shaped ceramic articles, prove to be useful as coating agent and lubricating agent, have a prospect of bringing about an effect of imparting improved properties to powdery materials on being incorporated therein, and promise to gain all the more in importance in the future.

As means for producing globular ceramic particles in a liquid using an inorganic metal salt, a method which obtains globular particles by adding a sol dropwise to a liquid (Japanese Patent Laid-Open SHO No. 57(1982)-84,731) and a method which produces inorganic minute globular particles by means of a liquid-phase intervacial reaction (Japanese Patent Publication SHO No. 57(1982)-55,454), for example, have been known to the art. The specification of Japanese Patent Laid-Open SHO No. 58(1983)-172,233 discloses a method for the production of minute globular particles of a zirconia substance. This method comprises heat-treating minute particles of zirconia substance with a carbonaceous substance interposed therebetween thereby effecting isolation and spheration of the minute particles of the zirconia substance. Japanese Patent Laid-Opens SHO No. 55(1980)-47,137 and SHO No. 55(1980)-132,626 disclose a method for producing globular particles by obtaining a mixed sol from an aqueous solution of a mixture of a zirconium salt with at least one member selected from the group consisting of titanium salts and tin salts, causing the mixed sol to be converted into globular hydrogel particles in a heated medium, allowing the globular hydrogel particles to age, and washing with water and drying the aged globular hydrogel particles. Further, a method (Japanese Patent Laid-Open SHO No. 61(1986)-263,628) which comprises causing an aqueous suspension of fine ceramic powder to be dispersed in the form of small drops in a high boiling liquid thereby forming globular particles and subsequently drying and calcining the globular particles has been known to the art. Further, in the production of globular particles of alumina, a method which effects dropwise addition of alumina sol to oil or organic solvent by the use of a spray nozzle, for example, has been adopted. The particles which are produced by the methods described above have diameters on the order of several microns to some tens of microns. Thus, they do not deserve to be called sufficiently minute.

In the specification of Japanese Patent Laid-Open SHO No. 61(1986)-227,917, there is disclosed a method for the production of minute globular particles of zirconia substance measuring not more than 1 micron (submicron) in diameter by the use of W/O type emulsion which is prepared by mixing an aqueous solution type emulsion which is prepared by mixing an aqueous solution containing a zirconium salt with an organic solvent in the presence of a surfactant.

An object of this invention, therefore, is to provide an improved method for the production of inorganic minute globular particles.

Another object of this invention is to provide a method for the production on a commercial scale of minute globular discrete particles of a composite oxide composed principally of alumina, titania, yttria, tin oxide, or silica in diameters on the order of some hundred microns to submicrons.

SUMMARY OF THE INVENTION

The objects described above are accomplished by a method for the production of inorganic minute globular particles, which comprises forming a W/O type sol emulsion by mixing at least one metal oxide-containing sol selected form the group consisting of (a) metal oxide sols and (b) mixed sols containing the metal oxide sols and an inorganic compound, an alkoxide, or a sol of at least one other element with an organic solvent insoluble or sparingly soluble in water in the presence of a surfactant; mixing the emulsion with a basic substance or an electrolyte thereby converting the sol forming the water layer in the emulsion into gel thereby obtaining globular gel particles; and subsequently heating the globular gel particles thereby expelling from the system the water in the globular gel particles in the form of a mixture thereof with the organic solvent.

EXPLANATION OF THE PREFERRED EMBODIMENT

Typical more concrete steps making up the method of this invention will be described below.

(1) A W/O type sol emulsion is prepared by vigorously mixing a metal oxide sol alone or a metal oxide-containing sol containing the metal oxide sol and an inorganic compound, an alkoxide, or a sol of at least one other element with an organic solvent insoluble or sparingly soluble in water in the presence of a surfactant.

(2) Then, the W/O type sol emulsion is mixed with a basic substance or an electrolyte to convert the sol forming the water layer of the W/O type sol emulsion into gel and obtain globular hydrogel particles.

(3) The globular gel emulsion thus obtained is heated to deprive the gel of water and effect contraction of the gel particles by azeotropic dehydration, divested of the organic solvent, and then dried to obtain minute globular particles.

(4) The minute globular particles are calcined to produce inorganic minute globular particles.

Now, this invention will be described more specifically below.

In this invention, the preparation of sol is important. Depending on the behavior of the prepared sol, the particles formed in the later stage may assume no globular shape, they may assume a globular shape but acquire no sufficient density or they may cohere and assume no discrete form. As means for preparing from an inorganic metal salt a corresponding metal oxide, sol, a method which peptizes a corresponding metal hydroxide with an acid, a method which pours a basic substance with stirring into an aqueous inorganic metal compound solution to a pH level such that no hydroxide is precipitated in consequence of the addition, and a method which effects hydrolysis of an aqueous solution containing an inorganic metal salt by heating the aqueous solution under normal pressure or under application of pressure have been widely known to the art.

For the sol to be desirable for this invention, it is necessary that the sol should possess a primary particle diameter amply smaller than the diameter of the globular particles desired to be produced and the sol should possess high purity such that anions and other similar impurities are contained therein only in minute amounts. After various studies which were conducted in search of a method capable of realizing ideal preparation of the sol, it has been found that a method which comprises stopping the reaction of hydrolysis before occurrence of the precipitate of metal hydroxide by one form of the so-called homogeneous precipitation method, i.e. the reaction of neutralization resorting to the hydrolysis of urea represented by the following formula, and subsequently effecting removal of defiling ions from the produced sol by the use of an ultrafiltration device proves to be desirable.

$$(NH_2)_2CO + H_2O \rightarrow 2NH_3 + CO_2$$

$$NH_3 \oplus H_2O \rightarrow NH_4^\oplus + OH^\ominus$$

The aqueous solution of an inorganic metal salt such as a nitrate, a chloride, or a sulfate of zirconium, aluminum, titanium, yttrium, tin, or silicon or the aqueous solution of a mixed metal salt obtained by adding to the aqueous solution of inorganic metal salt of at least one other element is prepared. As regards the concentration of the metal salt, since a large increase in the concentration results in an increase in the viscosity of the sol to be converted from the gel and renders the handling of the sol difficult, :this concentration is desired to fall in the range of 0.01 to 3 mols/liter, preferably 0.01 to 2 mols/liter. Then, urea is dissolved in the aqueous solution of the metal salt. The amount of the urea thus added is in the range of 0.3 to 5 mols, preferably 0.5 to 3 mols per mol of the metal salt. The urea is desired to incorporate therein a small amount of either a mineral acid such as hydrochloric acid, nitric acid, or sulfuric acid or an organic acid such as acetic acid, formic acid, propionic acid, maleic acid, or phthalic acid. The added acid serves the purpose of preventing the formed sol from aggregating and inducing precipitation of hydroxide. The amount of the acid to be added is in the range of 0.01 to 1 mol, preferably 0.01 to 0.5 mol, per mol of the metal salt.

The aqueous solution of the metal salt obtained as described above is stirred and, at the same time, heated to a temperature of not less than 90° C. to effect hydrolysis of the urea and continue the reaction of neutralization. In the initial stage of the reaction, the pH value of the aqueous solution is generally below 1. As the reaction proceeds, the pH value gradually increases and eventually reaches a level at which the reaction gives rise to precipitation of hydroxide. To obtain the sol in a state desirable for this invention, it is necessary that the reaction should be discontinued before the precipitation begins. Specifically, the discontinuation of the reaction is made before the pH value of the reaction solution rises to 6, preferably 5. As the result, there is obtained a transparent or translucent metal oxide sol.

Subsequently, the metal oxide sol is treated by the use of a filtering membrane, preferably an ultrafilter membrane for removal of defiling ions such as anions and ammonium ion from the sol. As means for defecating the sol, a method of diffusion, dialysis, or electrodialysis by the use of a semipermeable membrane and a method using an ion-exchange resin have been known to the art. These methods, however, have demerits of consuming much time and entailing a complicate procedure. For the defecation of the sol to be carried out on a commercial scale, use of an ultrafilter membrane proves to be advantageous. The ultrafilter membrane to be selected for the purpose of the defecation of the sol is required to possess a texture such that the pores contained therein permit selective passage of defiling ions and inhibit passage of sol particles. This invention does not discriminate the ultrafilter membrane on account of the shape thereof. The ultrafilter membrane usable effectively in this invention may be a flat membrane, a tubular membrane, or a spiral membrane, for example. The filtration device to be employed for the defecation of the sol is desired to be a circulation system which has the ultrafilter membrane set therein. This circulation system is capable of effecting continuous defecation by discharging out of the system the spent solvent containing the defiling ions and, at the same time, adding fresh solvent to the concentrated sol.

In the present invention, the defecation of the sol can be carried out efficiently by using a filter membrane which contains permeation pores of an average diameter in the range of 10 to 5,000 Å, preferably 30 to 2,000 Å, and a diameter distribution over a narrow range and operating this filter membrane under pressure not exceeding 10 kg/cm$^2$.G, preferably not exceeding 5 kg/cm$^2$.G. This defecation of the sol is continued until the concentration of the anions desired to be removed from the metal salt decreases below 3,000 ppm, preferably below 1,500 ppm. The defecation is completed after the sol concentration is adjusted. In the method of this invention for the production of minute globular particles, the concentration of the sol is not particularly limited. Since the sol concentration directly affects the diameters of the globular particles to be produced, however, it must be defined in advance depending on the diameters of the inorganic minute globular particles aimed at. The sol has the viscosity thereof increased by heightening the concentration of the sol. When this viscosity is unduly increased, the particle diameter distribution is liable to widen. To ensure production of minute globular particles of this invention, the solids content of the sol is desired to fall in the range of 0.5 to 30% by weight, preferably 2 to 10% by weight.

When the minute globular particles are to be prepared with two or more component substances, the mixed sol prepared as described above can be used of course. Otherwise, a sol obtained by adding to the simple metal oxide sol prepared as described above an inorganic compound or an alkoxide of at least one other element or a sol prepared by the method or some other method can be used. The amount of the metal species to be added in this case is less than 50% by weight, preferably less than 30% by weight, based on the amount of the mixed sol to be prepared. As examples of the composite inorganic substances for the minute globular particles to be produced as described above, there can be cited combinations of zirconia with at least one of the oxides of yttrium, calcium, magnesium, silicon, aluminum, and titanium; combinations of alumina with at least one of the oxides of zirconium, silicon, and magnesium; and combinations of titania with at least one of the oxides of tin, silicon, and zirconium.

The organic solvent to be used in the preparation of the W/O type sol emulsion from the metal oxide-containing sol is desired to be of the type insoluble or sparingly soluble in water. Examples of the solvent answering the description include aromatic hydrocarbons such as benzene, toluene, and xylene, halogenated hydrocarbons such as chlorobenzene, dichlorobenzene, carbon tetrachloride, dichloromethane, and trichloroethylene, aliphatic hydrocarbons such as heptane, octane, decane, and dodecane, alicyclic hydrocarbons such as cyclohexane and cyclododecane, aliphatic alcohols such as hexanols, heptanols, and octanols, and alicyclic alcohols such as cyclopentanol and cyclohexanol. By using a mixture of two or more organic solvents suitably selected form the group mentioned above so as to equalize the specific gravity of the sol with that of the mixed organic solvent, the W/O type sol emulsion can be produced with improved stability. Optionally, the organic solvent may incorporate therein a water-soluble organic solvent in an amount not so large as to affect adversely the formation of the W/O type sol emulsion.

The emulsification is carried out by the conventional method using a surfactant. To be more specific, it is accomplished by stirring the metal oxide-containing sol in the organic solvent mixed in advance with the surfactant. The emulsification may be effected mechanically by means of the conventional stirring blades. More desirably, it is accomplished by the use of a homogenizer, a colloid mill, or an ultrasonic dispersing machine, for example.

The surfactant to be used for the emulsification may be any of the conventional surfactants which are capable of causing W/O type emulsification. For the purpose of preventing the produced W/O type sol emulsion from being defiled with any metal ion originating in the surfactant so used, the surfactant is desired to be of the nonionic type. Examples of the nonionic surfactant include surfactants of the polyalkylene glycol types such as polyoxyethylene alkyl ether type, polyoxyethylene alkylaryl ether type, polyoxyethylene alkyl amine type, polyoxyethylene alkyl amide type, polyoxyethylene sorbitan fatty acid ester type, Pluronic type, and Tetronic type and of the polyhydric alcohol types. When an emulsion stabilizer is used in the emulsification, the produced emulsion is enabled to acquire improved stability. Examples of the emulsion stabilizer effectively usable for this purpose include such amino acids as glycine, alanine, phenyl alanine, valine, leucine, isoleucine, lysine, serine, aspartic acid, glutamic acid, methionine, and arginine and salts thereof or a polyhydric alcohol such as sorbitol and glycerol. The amount of the emulsion stabilizer to be used is in the range of 0.05 to 30% by weight, preferably 0.1 to 5% by weight to the sol.

As generally observed in the operation of any emulsification, the diameter of the particles in the produced emulsion and the stability of the emulsion are varied by various factors such as, for example, the kind of the organic solvent to be used, the volumetric ratio of the organic solvent to be used, the volumetric ratio of the organic solvent layer to the water layer, the kind and concentration of the surfactant, the mode of mechanical emulsification to be used for the preparation of the W/O type emulsion, and the temperature of the emulsion. A direct correlation exists between the diameter of particles in the emulsion and the diameter of the produced globular particles. More specifically, the diameter of the globular particles is determined by the diameter of particles in the emulsion and the concentration of the sol to be used. Thus, the conditions of the emulsification must be suitably selected to ensure production of the globular particles in a desired diameter.

Minute globular particles having a diameter in the range of 0.05 to 50 microns, preferably 0.1 to 20 microns, can be obtained by preparing a W/O type sol emulsion using the organic solvent insoluble or sparingly soluble in water in an amount in the range of 5 to 80% by weight, desirably 10 to 60% by weight, and more desirably 30 to 50% by weight, the metal oxide-containing sol in an amount not exceeding 95% by weight and desirably falling in the range of 40 to 90% by weight, more desirably 50 to 70% by weight, and the surfactant in an amount in the range of 0.1 to 30% by weight, desirably 1 to 10% by weight, and more desirably 1 to 5% by weight, respectively based on the amount of the W/O type sol emulsion. The diameter of the particles is mainly governed by the sol concentration and the diameter of particles in the emulsion during the course of the preparation of the W/O type sol emulsion. By preparing the emulsion so that the particles contained therein have a diameter distribution over a narrow range, the minute globular particles are produced with diameters distributed over a narrow range. The reaction for the formation of the W/O type sol emulsion is carried out at a temperature in the range of 0° to 60° C., preferably 10° to 40° C.

From the W/O type sol emulsion prepared as described above, globular hydrogel particles are obtained by converting the sol forming the water layer of the sol emulsion into a gel. This conversion to the gel is advantageously attained by addition of a basic substance or an electrolyte to the sol emulsion. If the aqueous solution of a chloride or nitrate of an alkali metal or an alkaline earth metal is used as the additive, this additive is liable to impair the particle diameter distribution and the sphericity of particles. Thus, the additive thus used is desired to be of a non-aqueous type. Preferably, ammonia gas, an organic solvent soluble basic organic substance such as dioctyl amine, didodecyl amine, pyridine, etc. or solution of such substance in an organic solvent which forms an organic phase of the emulsion are used as a basic substance. A chelate compound such as tris-(acetylacetonato) aluminum (III), tetrakis-(acetylacetonato) zirconium (IV), tris(acetylacetonato) yttrium (III), tris(2,2'-bipyridine) aluminum (0), tris(2,2'-bipyridine) titanium (0), tris (1,10-phenanthroline) titanium(0), and tris(tropolonate) aluminum (III); an organic complex compound such as tetrachloro(acetonitrile) titanium (IV) and tetrachlorobis-(acetonitrile) zirconium (IV); and an organic acid salt such as silicon tetracetate and tin acetate (IV) dissolved in an organic solvent which forms an organic phase of the emulsion are used as an electrolyte. The amount of the basic substance or the electrolyte to be used is in the range of 0.01 to 50% by weight, preferably 0.05 to 10% by weight, based on the amount of the solids of the W/O type sol emulsion.

Optionally, the gelation of the sol emulsion can be attained by subjecting the sol emulsion to a heat treatment. If the gelation is carried out solely by the heat treatment, there may ensue the possibility that part of the globular particles will be fractured during the course of gelation and, as the result, the individual globular particles will undergo aggregation. For perfect prevention of this adverse phenomenon, it is desirably to subject the W/O type sol emulsion preparatorily to gelation by the method of this invention to obtain globular gel particles and subject the globular gel particles, in the next step, to a heat treatment for dehydration. The temperature of this reaction for gelation is in the range of 0° to 100° C., preferably 10° to 40° C. The thermal dehydration of the globular gel particles is carried out at a temperature in the range of 10° to 120° C., preferably 50° to 100° C.

We have found that when the W/O type sol emulsion is obtained by using a sol formed by preparatorily incorporating a water-soluble organic substance in a metal oxide-containing sol, the gelation is allowed to proceed more smoothly and the microcrystals formed on the surface of the minute globular particles are arranged with improved regularity. Examples of the water-soluble organic substance thus incorporated preparatorily in the metal oxide-containing sol include aliphatic alcohols such as methanol, ethanol, propanol, isopropanol, and butanol, glycols such as ethylene glycol, diethylene glycol, polyethylene glycol, propylene glycol, and polypropylene glycol, cellulose derivatives such as carboxymethyl cellulose, hydroxy ethyl cellulose, hydroxypropyl cellulose, methyl cellulose and ethyl cellulose, starch derivatives such as starch, hydroxyethyl starch and hydroxypropyl starch, and water soluble polymers such as polyacrylic acid, polyvinyl alcohol, polyethylene glycol ester, and polyacrylamide. The amount of the water-soluble organic substance to be effectively used for the purpose is in the range of 0.1 to 10% by weight, preferably 0.5 to 5% by weight, based on the amount of the solids in the metal oxide-containing sol.

The globular gel particles obtained as described above are relatively stable. When they are dried immediately, however, their globular shape is impaired during the course of drying. Thus, they must be dehydrated before they are dried. This dehydration is attained by heating the gel emulsion in its unmodified form so as to expel the water from the system in the form of a mixture with the organic solvent. In this case, the minute particles of this invention having diameters on the order of submicrons are obtained since the globular hydrogel particles are contracted owing to the extraction of water therefrom. Thereafter, the minute globular particles in a discrete form can be easily obtained by removal of the organic solvent. Though the globular particles are not a sintered product, they possess strength enough to defy preakage due to ordinary mechanical attrition or ultrasonic vibration. The powder thus produced is hydrophobic and olephilic, it is quickly dispersed in virtually all organic solvents including alcohols.

Preparatory to the production of the minute globular particles of gel, it is desirable to remove the surfactant dissolved in the organic solvent which remains after the dehydration. For this removal, the separation of the minute globular particles from the organic solvent forms a precondition. Where minute particles aimed at include those of diameters falling on the order of submicrons as in the present invention, no proper means is available for the selective seizure of the particles. By the conventional method of filtration or centrifugation, the seizure of these particles is not easily obtained or is obtained only with very poor efficiency. It has been heretofore difficult to effect the removal of the surfactant and the consequent defecation of the minute globular particles on a commercial scale.

We have further found that the method of defecation of the sol can be advantageously applied to the removal of the surfactant dissolved in the organic solvent and the consequent defecation of the minute globular particles of gel.

To be specific, the defecation is continuously carried out by introducing the organic solvent containing the dehydrated minute globular particles of gel into a filtering device, preferably a circulation type filtering device thereby expelling out of the system the organic solvent containing the surfactant as dissolved therein and, at the same time, adding fresh solvent to the concentrated solution containing the minute glubular particles of gel. The filter membrane which is used in this case must be made of a material impervious to the action of the organic solvent. Similarly to the treatment performed on the sol, an ultrafilter membrane or a porous membrane possessing a larger pore diameter than the ultrafilter membrane and generally passing under the name of "Micropore Filter" is used advantageously. During this treatment, the minute globular particles of gel are circulated through the system without being passed through the filter membrane and the surfactant is passed through the filter membrane and discharged out of the system. The pressure used for the filtration need not exceed the maximum pressure that can be endured by the membrane. The pressure generally falls in the range of 1 to 3 kg/cm$^2$, preferably 1.5 to 2.5 kg/cm$^2$.

The defecation is continued until the solution resulting from the defecation is composed of the minute globular particles of gel coated with the surfactant and the solvent substantially free from the surfactant. In this while not less than 60% of the surfactant initially added to the system is removed and recovered. The surfactant so recovered can be put to use again in the treatment. This reclamation of the surfactant not merely contributes to the economy of the method of this invention but also widens notably the range of applications in which the produced minute globular particles of gel find utility because these particles can be used in a state not containing the unnecessary surfactant at the time they are combined with other materials such as polymer compounds for the production of composite materials.

When the minute globular particles of gel thus obtained by the dehydration of metal oxide-containing sol emulsion are calcined, there are produced minute globular particles of metal oxide because the particles of gel are enabled by the calcining to undergo dehydration and crystallization while retaining their globular shape intact. The minute globular particles acquire high density and high strength when this calcination is carried out at a temperature exceeding 350° C., the temperature at which the surfactant is decomposed.

Now, the present invention will be described more specifically below with reference to working examples.

EXAMPLE 1

Preparation of zirconia sol

In 170 liters of purified water, 35 mols of zirconium nitrate was dissolved. To the resultant solution, 40 mols of urea and 2.5 mols of acetic acid were added. The resultant solution was refluxed and stirred for 6 hours to effect hydrolysis and form a clear sol. At the end of the reaction, the sol was found to possess a pH value of 2.1.

Then, the zirconia sol was left standing overnight and led to an ultrafiltration device to be defecated. This filtration device was provided with an ultrafilter membrane possessing a total filtration area of about 9 m$^2$ and an average permeation pore diameter 50 Å. The sol was pumped into the filtration device at a filtration pressure of 2 kg/cm$^2$.G. The filtrate which had been passed through the membrane was discarded and the sol particle-containing liquid which had not been passed through the membrane but had been passed over the membrane was recycled. In this manner, continuous filtration and concentration of the sol was carried out. When the sol decreased to about one half of the original volume thereof, it was diluted with purified water to a total volume of 250 liters. The diluted sol was subjected again to the cycle of filtration and concentration. This procedure was repeated until desired defection of the sol was obtained. During the course of this defecation of the sol, the sol under treatment was sampled and analyzed for NO$_3$-concentration at regular intervals. The defecation was discontinued when the NO$_3^-$ concentration in the sol fell below 1,000 ppm. The sol was adjusted to a zirconia concentration of 5% by weight as ZrO$_2$. The total volume of water required for this defection was about 5 m$^3$.

EXAMPLE 2

In 1 liter of toluene, 20 g of polyoxyethylene sorbitan fatty acid ester type surfactant (HLB 8.6) (produced by Kao Corp. Ltd. and marketed under trademark designation of "SP-L10") was dissolved. The solution was vigorously stirred with a homogenizer. In the vigorously stirred solution, 0.5 liter of zirconia sol obtained by diluting the sol prepared in Example 1 with purified water to a concentration of 2% by weight was further stirred for about 1 hour to prepare a W/O type sol emulsion. Then, this W/O type sol emulsion was stirred and 100% ammonia gas was blown into the stirred emulsion at a flow rate of 20 ml/min for about 2 hours to effect gelation of the sol emulsion. Then, the resultant gel emulsion was heated to expel the water azeotropically from the emulsion. From the dehydrated emulsion, toluene was recovered by drying. The fine globular particles obtained after the drying was calcined at 800° C. for 2 hours, to produce fine globular particles of zirconia 0.2 micron in average diameter. The powder thus obtained exhibited highly desirable dispersibility. When this powder was ground in a mortar or it was mixed with a dispersion medium such as water and exposed to ultrasonic vibration, it was easily redispersed into primary particles. When the powder resulting from the procedure mentioned above was observed under a transmission electron microscope, it was found to be composed wholly of minute globular particles. The particles possessing diameters in the range of 0.1 to 0.3 micron accounted for more than 90% of all the particles of the powder.

EXAMPLE 3

In 1 liter of toluene having dissolved therein 10 g of a water-soluble surfactant (HLB about 6) (produced by Daiichi Kogyo Seiyaku Co., Ltd. and marketed under trademark designation of "discoal 206"), 500 ml of a zirconia sol obtained by diluting the sol prepared in Example 1 with purified water to a concentration of 4% by weight and vigorously stirred with a homogenizer was gradually introduced and stirred for about 1 hour, to prepare a W/O type sol emulsion. Then, this W/O type sol emulsion was stirred and, at the same time 100% ammonia gas was blown into the stirred emulsion at a flow rate of 20 ml/min for about 2 hours to effect gelation of the sol emulsion. Then the gel emulsion was azeotropically distilled to expel water therefrom. Form the dehydrated emulsion, toluene was recovered by drying. The minute globular particles obtained after the drying were calcined at 800° C. for 2 hours, to obtain minute globular particles of zirconia 0.2 micron in average diameter. The powder thus obtained exhibited highly desirable dispersibility. When it was ground in a mortar or it was mixed with a dispersion medium such as water and exposed to ultrasonic vibration, it was easily redispersed into primary particles. When the powder resulting from the treatment mentioned above was observed under a transmission electron microscope, it was found to be composed wholly of minute globular particles. The particles having diameters in the range of 0.1 to 0.3 micron accounted for more than 90% of all the particles of the powder.

EXAMPLE 4

A W/O type emulsion was prepared by dissolving in 1 liter of toluene 10 g of surfactant (HLB about 9) formed with polyoxyethylene sorbitan fatty acid ester, vigorously stirring the solution with a homogenizer, adding to the stirred solution 0.7 liter of a zirconia sol obtained by diluting the sol prepared in Example 1 to a concentration of 2% by weight, and stirring the resultant mixture for about 1 hour. Then, the W/O type sol emulsion was stirred and, at the same time, 100% ammonia gas was blown in the stirred sol emulsion at a rate of 20 ml/min. for about 2 hours, to effect gelation of the sol emulsion. Thereafter, the gel emulsion was azeotropically distilled to expel water therefrom. From the dehydrated emulsion, toluene was recovered by drying. The minute globular particles obtained after the drying were calcined at 800° C. for 2 hours to produce minute globular particles of zirconia having an average diameter of 0.4 micron. The powder thus obtained exhibited highly desirably dispersibility. When this powder was ground in a mortar or it mixed with a dispersion medium such as water and exposed to ultrasonic vibration, it was easily redispersed into primary particles. When the powder resulting from the treatment mentioned above was observed under a transmission electron microscope, it was found to be composed wholly of minute globular particles. The particles having diameters in the range of 0.2 to 0.5 micron accounted for more than 90% of all the particles of the powder.

EXAMPLE 5

A W/O type sol emulsion was prepared by dissolving in 1 liter of toluene 5 g of a surfactant (HLB about 4) formed with polyoxyethylene sorbitan fatty acid ester, vigorously stirring the resultant solution with a homogenizer and, at the same time, adding to the stirred solution a solution of 1 g of glycine in 1 liter of a zirconia sol obtained by diluting the sol prepared in Example 1 with purified water to a concentration of 3% by weight, and stirring the resultant mixture for about 1 hour. Then, this W/O type sol emulsion was stirred and, at the same time, 100% ammonia gas was blown into the stirred sol emulsion at a flow rate of 20 ml/min. for about 2 hours to effect gelation of the sol emulsion. Thereafter, the gel emulsion was azeotropically distilled to expel water therefrom. From the dehydrated emulsion, toluene was recovered by drying. The minute globular particles obtained after the drying were calcined at 800° C. for 2 hours, to produce minute globular particles having an average diameter of 0.7 micron. The powder thus obtained exhibited highly desirable dispersibility. When this powder was ground in a mortar or it was mixed with a dispersion medium such as water and exposed to ultrasonic vibration, it was easily redispersed into primary particles. When the powder resulting from the treatment mentioned above was observed under a transmission electron microscope, it was found to be composed wholly of minute globular particles. The particles having diameters in the range of 0.6 to 0.8 micron accounted for more than 90% of all the particles of the powder.

EXAMPLE 6

A W/O type sol emulsion was prepared by dissolving in 1 liter of toluene 10 g of a surfactant (HLB about 9) formed with polyoxyethylene sorbitan fatty acid ester, vigorously stirring the resultant solution with a homogenizer and, at the same time, adding to the stirred solution a solution of 1 g of polyvinyl alcohol in 0.5 liter of a zirconia sol obtained by diluting the sol prepared in Example 1 to a concentration of 5% by weight, and stirring the resultant mixture for about 1 hour. Then, this W/O type sol emulsion was stirred and, at the same time, 100% ammonia gas was blown into the stirred sol emulsion at a flow rate of 20 ml/min. for about 2 hours to effect gelation of the sol emulsion. Thereafter, the gel emulsion was azeotropically distilled to expel water therefrom. Form the dehydrated emulsion, toluene was recovered by drying. The minute globular particles obtained after the drying were calcined at 800° C. for 2 hours to produce minute globular particles of zirconia having an average diameter of 0.4 micron. The powder thus obtained exhibited highly desirable dispersibility. When this powder was ground in a mortar or it was mixed with a dispersion medium such as water and exposed to ultrasonic vibration, it was easily redispersed into primary particles. When the powder resulting from the treatment mentioned above was observed under a transmission electron microscope, it was found to be composed wholly of minute globular particles. The particles having diameters in the range of 0.3 to 0.6 micron accounted for more than 90% of all the particles of the powder. When the powder before the calcination was examined with a scanning electron microscope, it was found that the particles of the powder which had been gelled with ammonia gas showed a relatively irregular scaly surface when the addition of polyvinyl alcohol was omitted and a regular finely grained surface when the addition of polyvinyl alcohol was made.

EXAMPLE 7

A W/O type sol emulsion was prepared by dissolving in 1 liter of toluene 20 g of a surfactant (HLB about 9) formed with polyoxyethylene sorbitan fatty acid ester, vigorously stirring the resultant solution with a homogenizer and, at the same time, adding to the stirred solution 0.5 liter of a zirconia sol obtained by diluting the sol prepared in Example 1 with purified water to a concentration of 2% by weight, and stirring the resultant mixture for about 1 hour. Then, this W/O type sol emulsion was stirred and, at the same time, a solution of 3.5 g of tetrakisacetyl acetonate zirconium (IV) in 100 ml of toluene was added to the stirred sol emulsion and the resultant mixture was stirred for 30 minutes to effect gelation of the sol emulsion. The gel emulsion was azeotropically distilled to expel water therefrom. The minute globular particles consequently obtained were separated by filtration, washed with 100 ml of methanol, dried at 150° C. for 30 minutes, and then calcined at 800° C. for 2 hours, to produce minute globular particles of zirconia having an average diameter of 0.2 micron. The powder thus obtained exhibited highly desirable dispersibility. When this powder was ground in a mortar or it was mixed with a dispersion medium such as water and then exposed to ultrasonic vibration, it was easily redispersed into primary particles. When the powder resulting from the treatment mentioned above was observed under a transmission electron microscope, it was found to be composed wholly of minute globular particles. The particles having diameters in the range of 0.1 to 0.3 micron accounted for more than 90% of all the particles of the powder. When the powder before the calcination was observed under a scanning microscope, the particles thereof were found to possess a furry surface.

EXAMPLE 8

A solution of 230 g of a surfactant (HLB 8.6) formed with polyoxyethylene sorbitan fatty acid ester in 10 liters of toluene was vigorously stirred with a colloid mill and, at the same time, 6 liters of a mixed sol containing yttria sol and zirconia sol was added to the stirred solution. This mixed sol was obtained by adding a yttrium sol prepared from yttrium hydroxide to the zirconia sol prepared in Example 1 in a ratio such that $Y_2O_3$ was contained in zirconia in a concentration of 3 mol% and the combined sol concentration was 3% by weight as $ZrO_2$. After the addition of this mixed sol, the resultant mixture was stirred for about 30 minutes, to produce a W/O type sol emulsion. Then, this W/O type sol emulsion was stirred and, at the same time, 100% ammonia gas was blown into the stirred sol emulsion at a flow rate of 200 ml/min for about 2 hours, to effect gelation of the sol emulsion. Thereafter, the gel emulsion was azeotropically distilled to expel water therefrom. From the dehydrated emulsion, toluene was recovered by drying. The minute globular particles obtained after the drying were calcined at 800° C. for 2 hours, to produce minute globular particles having an average diameter of 0.2 micron and a $Y_2O_3$ content of 3 mol%. When the powder thus obtained was observed under a transmission electron microscope, it was found to be composed wholly of minute globular particles. The particles having diameters in the range of 0.1 to 0.3 micron accounted for more than 90% of all the particles of the powder. A sludge was prepared by uniformly mixing the powder of minute globular particles thus obtained with purified water and an acryl type organic binder in a ball mill. Then, by cast molding the sludge, there were obtained 10 sintered test pieces $4 \times 40$ mm² in surface area and 3 mm in thickness. By the Archimedean method, these sintered pieces were found to possess average density of 6.08 g/cm³.

EXAMPLE 9

A W/O type sol emulsion as prepared by dissolving in 1 liter of n-octanol 6 g of a surfactant (HLB about 7) and 4 g of a surfactant (HLB about 5) both formed with polyoxyethylene sorbitan fatty acid ester, stirring the resultant solution with a homogenizer and, at the same time, adding to the stirred solution 1 liter of what was obtained by vacuum concentrating the sol prepared in Example 1 to 7% by weight, and stirring the resultant mixture for about 1 hour. Then, this W/O type sol emulsion was stirred and, at the same time, 100% ammonia gas was blown into the stirred sol emulsion at a flow rate of 20 ml/min for about 2 hours, to effect gelation of the sol emulsion. Thereafter, the gel emulsion was vacuum evaporated to dryness to expel water and the organic solvent therefrom. When the minute globular particles consequently obtained were calcined for 2 hours, there were obtained minute globular particles of zirconia having an average diameter of 3 microns. The powder thus obtained exhibited highly desirable dispersibility. When this powder was ground in a mortar or it was mixed with a dispersion medium such as water and then exposed to ultrasonic vibration, it was easily redispersed into primary particles. When the powder resulting from the treatment mentioned above was observed under a transmission electron microscope, it was found to be composed wholly of minute globular particles. The particles having diameters in the range of 1 to microns accounted for more than 90% of all the particles of the powder.

EXAMPLE 10

A W/O type sol emulsion was prepared by dissolving in 1 liter of toluene 25 g of a surfactant of the sorbitan fatty acid ester type (HLB 8.6) (Produced by Kao Corp. and marketed under trademark designation of "SP-L10"), vigorously stirring the resultant solution with a homogenizer and, at the same time, adding to the stirred solution 0.5 liter of a zirconia sol obtained by diluting the sol prepared in Example 1 with purified water to a concentration of 2% by weight, and stirring the resultant mixture for about 1 hour. Then, this W/O type sol emulsion was stirred and, at the same time, 100% ammonia gas was blown into the stirred sol emulsion at a flow rate of 20 ml/min. for about 2 hours, to effect gelation of the sol emulsion. Thereafter, the gel emulsion was azeotropically distilled to expel water therefrom.

Then, the gel emulsion was pumped into a filtration device incorporating therein a filter membrane possessing a total filtration area of 2,000 $cm^2$ and an average permeation pore diameter of about 200 Å. The filtrate which had been passed through the membrane was discarded and the liquid containing the minute globular particles of gel which had not been passed through the membrane was recycles. In this manner, the sol was continuously filtered and concentrated. When the gel emulsion decreased to about 500 ml, the discharge of the filtrate and the removal of the surfactant were continued by addition of toluene. The defecation of the sol emulsion was discontinued after the amount of the added toluene reached a total of 5 liters. Consequently, there was obtained 300 cc of a solution having globular particles of zirconia gel of an average diameter of 0.23 micron discretely dispersed in toluene. The amount of the surfactant recovered amounted to 67% of the whole surfactant used.

EXAMPLE 11

A solution in 10 liters of toluene of 200 g of a surfactant (HLB 8.6) formed with polyoxyethylene sorbitan fatty acid ester was vigorously stirred with a colloid mill and, at the same time, 6 liters of a mixed sol containing yttria sol and zirconia sol was added to the stirred solution. This mixed sol was obtained by dissolving in the zirconia sol prepared in Example 1 thoroughly cleaned yttrium hydroxide in a ratio such that yttria was contained in zirconia in a concentration of 3 mol% and the combined sol concentration was 4% by weight as $ZrO_2$. After the addition of the mixed sol, the resultant mixture was stirred for about 1 hour, to produce a W/O type sol emulsion. Then, this W/O type sol emulsion was stirred and, at the same time, 100% ammonia gas was blown into the stirred sol emulsion at a flow rate of 200 ml/min for about 2 hours, to effect gelation of the sol emulsion. Thereafter, the gel emulsion was azeotropically distilled to expel water therefrom.

Then the gel emulsion was pumped into a filtration device provided with filter membrane of hollow fibers having a total filtration area of 1 $m^2$ and an average permeation pore diameter of about 0.1 micron. The filtrate which had been passed through the membrane was discarded and the liquid containing the minute globular particles of gel which had not been passed through the membrane was recycled. In this manner, the gel emulsion was continuously filtered and concentrated. When the gel emulsion decreased to about 2 liters, the discharge of the filtrate and the removal of the surfactant were continued by addition of methanol. The defecation of the gel emulsion was discontinued when the amount of methanol so added totalled 10 liters. The amount of the surfactant recovered was found to account for 74% of all the surfactant used.

The powder obtained by drying the resultant methanol solution was found to contain no discernible excess surfactant and was found to be composed solely of globular particles of zirconia gel coated with the surfactant. When this powder of globular particles was added to isopropanol, it was easily redispersed into primary particles. When this powder was calcined at 600° C., there were obtained minute globular particles of zirconia gel containing 3 mol % of $Y_2O_3$. The average particle diameter of these particles was about 0.4 micron. When this powder was mixed with water and mildly stirred mechanically, it was easily redispersed into primary particles.

EXAMPLE 12

A clear sol was formed by dissolving 4 mols of zirconium nitrate in 20 liters of purified water, adding 5 mols of urea and 0.3 mol of acetic acid to the resultant solution, and refluxing and stirring the resultant mixture for 5 hours to effect hydrolysis. The sol produced in consequence of the reaction possessed a pH value of 2.5. Then, the zirconia sol was left standing overnight and then introduced into an ultrafiltration device to be defecated. This filtration device was provided with an ultrafilter membrane possessing a total filtration area of about 2,000 $cm^2$ and an average permeation pore diameter of 50 Å. The defecation the sol was carried out by following the procedure of Example 1 until the sol concentration reached 7% by weight. The sol thus defecated was found to contain $No_3^-$ in a concentration of 3,200 ppm.

By using 0.5 liter of the sol prepared as described above and following the procedure of Example 2, minute globular particles were obtained through the steps of preparation of W/O type sol emulsion, gelation of the sol emulsion, dehydration of water by azeotropic distillation, and desiccation. The minute globular particles were calcined at 800° C. for 2 hours, to produce a zirconia powder. When this zirconia powder was mixed with water and then exposed to ultrasonic vibration, part of the particles thereof cohered to form flocs. By the measurement with a sedimentation particle size distribution meter, the amount of flocs was found to account for about 10% by weight of all the particles of the powder.

EXAMPLE 13

Preparation of alumina sol

In 170 liters of purified water, 30 mols of aluminum nitrate was dissolved. The resultant solution was mixed with 30 mols of urea and 1.5 mols of acetic acid. A clear sol was formed by refluxing and stirring the resultant mixture for 3 hours to effect hydrolysis. Then, the alumina sol was left standing overnight and then introduced into an ultrafiltration device to be defecated therein. The ultrafiltration device was operated in entirely the same manner as in the case of the zirconia sol of Example 1. The sol resulting from the defecation was adjusted to a concentration of 8% by weight. The adjusted sol was found to contain $NO_3^-$ in a concentration of 700 ppm.

EXAMPLE 14

A W/O type sol emulsion was prepared by dissolving in 1 liter of toluene 30 g of a surfactant formed with polyoxyethylene sorbitan fatty acid ester, vigorously stirring the resultant solution with a homogenizer and, at the same time, adding to the stirred solution 0.5 liter of an alumina sol obtained by diluting the sol prepared in Example 13 with purified water to a concentration of 5% by weight, and stirring the resultant mixture for about 1 hour. Then, this W/O type sol emulsion was stirred and, at the same time, 100% ammonia gas was blown into the stirred sol emulsion at a flow rate of 20 ml/min. for about 2 hours, to effect gelation of the sol emulsion. Thereafter, the gel emulsion was azeotropically distilled to expel water therefrom. From the dehydrated emulsion, toluene was recovered by drying. The minute globular particles obtained after the drying were calcined at 1,200° C. for 2 hours, to produce a compact mass of minute globular particles of alumina having an average diameter of 0.2 micron. The powder thus obtained exhibited highly desirable dispersibility. When this powder was ground in as mortar or it was mixed with a dispersion medium such as water and then exposed to ultrasonic vibration, it was easily redispersed into primary particles. When the powder resulting from the treatment mentioned above was observed under a transmission electron microscope, it was found to be composed wholly of minute globular particles. The particles having diameters in the range of 0.1 to 0.3 micron accounted for more than 80% of all the particles of the powder.

EXAMPLE 15

A W/O type sol emulsion was prepared by dissolving in 1 liter of toluene 10 g of a surfactant formed with polyoxyethylene sorbitan fatty acid ester, vigorously stirring the resultant solution with a homogenizer and, at the same time, adding to the stirred solution 0.8 liter of an alumina sol prepared in a concentration of 8% by weight in Example 13, and stirring the resultant mixture for about 1 hour. Then, this W/O type sol emulsion was stirred and, at the same time, 100% ammonia gas was blown into the stirred sol emulsion at a flow rate of 20 ml/min. for about 2 hours, to effect gelation of the sol emulsion. Thereafter, the gel emulsion was azeotropically distilled to expel water therefrom. From the dehydrated emulsion, toluene was recovered by drying. When the minute globular particles obtained after the drying were calcined at 400° C. for 2 hours, there were obtained minute globular particles of alumina having an average diameter of 0.8 micron. The powder thus obtained exhibited highly desirable dispersibility. When this powder was ground in a mortar or it was mixed with a dispersion medium such as water and then exposed to ultrasonic vibration, it was easily redispersed into primary particles. When the powder resulting from the treatment mentioned above was observed under a transmission electron microscope, it was found to be composed wholly of minute globular particles. The particles having diameters in the range of 0.7 to 0.9 micron accounted for more than 80% of all the particles of the powder.

EXAMPLE 16

In 5,680 g of a zirconia sol prepared in a concentration of 5% by weight in Example 1, an amount of defecated yttrium hydroxide equivalent to 16.2 g of $Y_2O_3$ was dissolved. This sol was mixed with 938 g of an alumina sol prepared in concentration of 8% by weight in Example 13 to prepare a mixed sol composed of zirconia containing 3 mol % of $Y_2O_3$ and alumina in a gravimetric ratio of 8:2. A solution in 15 liters of n-octanol of 150 g of a surfactant (HLB about 6) formed with sorbitan fatty acid ester was stirred with a homogenizer and, at the same time, the aforementioned mixed sol was added to the stirred solution. A W/O type sol emulsion was prepared by placing the premixed solution in a colloid mill and stirring this solution for 1 hour.

Then, this W/O type sol emulsion was stirred and, at the same time, 100% ammonia gas was blown into the stirred sol emulsion at a flow rate of 200 ml/min for about 2 hours, to effect gelation of the sol emulsion. The gel emulsion was then stirred and evaporated to dryness in a vacuum drier, to expel water and the n-octanol therefrom. When the minute globular particles consequently obtained were calcined at 1,000° C. particles of alumina-containing zirconia having an average diameter of 0.5 μm. The powder thus obtained exhibited highly desirable dispersibility. When this powder was ground in a mortar or it was mixed with a dispersion medium such as water and then exposed to ultrasonic vibration, it was easily redispersed into primary particles. When the powder resulting form the treatment mentioned above was observed under a transmission electron microscope, it was found to be formed wholly of minute globular particles. The particles having diameters in the range of 0.4 to 0.6 micron accounted for more than 80% of all the particles of the powder.

What is claimed is:

1. A method of producing inorganic minute globular particles comprising, forming a W/O sol emulsion by mixing (1) at least one metal oxide-containing sol selected from the group consisting of (a) metal oxide sols and (b) mixed sols containing said metal oxide sols and an inorganic compound, an alkoxide, or a sol of at least one other element, with (2) an organic solvent, insoluble or sparingly soluble in water, in the presence of a surfactant; mixing said emulsion with a basic substance or an electrolyte to convert said sol forming the water layer in said emulsion into gel to provide globular gel particles; and subsequently heating said globular gel particles to expel water in said globular gel particles in the form of a mixture thereof with said organic solvent.

2. A method according to claim 1, wherein said organic solvent insoluble or sparing soluble in water is used in an amount in the range of 5 to 80% by weight and said surfactant in an amount in the range of 0.1 to 30% by weight, based on the amount of said W/O type sol emulsion.

3. A method according to claim 2, wherein said surfactant is a nonionic surfactant.

4. A method according to claim 3, wherein said nonionic surfactant is of the polyalkylene glycol type or the polyhydric alcohol type.

5. A method according to claim 2, wherein said basic substance is ammonia gas and said electrolyte is a solution of an organic metal salt in an organic solvent.

6. A method according to claim 2, wherein said basic substance or said electrolyte is used in an amount in the range of 0.01 to 50% by weight, based on the amount of solids of said W/O type sol emulsion.

7. A method according to claim 2, wherein the thermal dehydration of said globular gel particles is carried out at a temperature in the range of 10° to 120° C.

8. A method according to claim 1, wherein said formation of said W/O type sol emulsion is carried out in the presence of a water-soluble organic substance in an amount in the range of 0.05 to 30% by weight, based on the amount of solids in the metal oxide-containing sol.

9. A method according to claim 1, which comprises using a metal oxide-containing sol to be produced by preparing a metal oxide-containing sol from an aqueous inorganic metal salt solution by hydrolysis of urea therein and subsequently defecating said metal oxide-containing sol by the use of a filtering membrane.

10. A method according to claim 1, wherein said metal is at least one member selected from the group consisting of zirconium, aluminum, titanium, ytrrium, tin, and silicon.

11. A method according to claim 1, wherein said metal is at least one member selected from the group consisting of zirconium, aluminum and yttrium.

12. A method according to claim 1, which further comprises defecating the solution containing said globular gel particles by the use of a filtering membrane.

13. A method according to claim 12, wherein said organic solvent insoluble or sparing soluble in water is used in an amount in the range of 5 to 80% by weight and said surfactant in an amount in the range of 0.1 to 30% by weight, based on the amount of said W/O type sol emulsion.

14. A method according to claim 13, wherein said surfactant is a nonionic surfactant.

15. A method according to claim 13, wherein an amino acid or a salt thereof or a polyhydric alcohol is used in combination with said surfactant.

16. A method according to claim 13, wherein said basic substance is ammonia gas and said electrolyte is a solution of an organic metal salt in an organic solvent.

17. A method according to claim 13, wherein said basic substance or said electrolyte is used in an amount in the range of 0.1 to 50% by weight, based on the amount of solids of said W/O type sol emulsion.

18. A method according to claim 12, wherein said formation of said W/O type sol emulsion is carried out in the presence of a water-soluble organic substance in an amount in the range of 0.05 to 30% by weight, based on the amount of solids in the metal oxide-containing sol.

19. A method according to claim 12, which comprises using a metal oxide-containing sol to be produced by preparing a metal oxide-containing sol from an aqueous inorganic metal salt solution by hydrolysis of urea therein and subsequently defecating said metal oxide-containing sol by the use of a filtering membrane.

20. A method according to claim 12, wherein said metal is at least one member selected from the group consisting of zirconium, aluminum, titanium, yttrium, tin, and silicon.

21. A method according to claim 12, wherein said filtering membrane is an ultrafilter membrane.

* * * * *